United States Patent [19]

Williamson et al.

[11] 3,883,831

[45] May 13, 1975

[54] SURFACE WAVE DEVICES

[75] Inventors: Richard C. Williamson, Framingham; Ernest Stern, Concord, both of Mass.

[73] Assignee: Massachusetts Institute of Technology, Cambridge, Mass.

[22] Filed: Sept. 27, 1973

[21] Appl. No.: 401,461

[52] U.S. Cl. .................. 333/30 R; 310/8.1; 310/9.8; 333/72

[51] Int. Cl. ........ H03h 9/26; H03h 9/30; H01v 7/00

[58] Field of Search ......... 333/72, 30 R, 6; 310/8.0, 310/8.1, 8.2, 9.7, 9.8

[56] References Cited

UNITED STATES PATENTS 3,568,102 3/1971 Tseng ................................ 333/30 R

OTHER PUBLICATIONS

Williamson et al., Electronic Letters, Vol, 8, No. 16, Aug. 10, 1972, pages 401–402.

*Primary Examiner*—James W. Lawrence
*Assistant Examiner*—Marvin Nussbaum
*Attorney, Agent, or Firm*—Arthur A. Smith, Jr.; Martin M. Santa; Robert F. O'Connell

[57] ABSTRACT

A device for handling surface elastic waves using a plurality of reflective elements, such as grooves, on the surface thereof the dimensional characteristics of which may be arranged to vary in a predetermined manner from element to element to provide a band-pass filtering action on a surface wave reflected therefrom. The device may be formed in various configurations using single or double reflections to provide single or multiple filtering action or phase coded filter action and the orientation of the reflective elements may be varied to vary the center frequency of the filter. A further embodiment uses a compensating strip of material positioned in the propagating path of a surface wave, the dimensional characteristics of such strip being arranged to vary so as to change the velocity of the wave and to achieve phase error compensation thereby. Further, a strip of energy absorbing material may also be used to control the amplitude response of the filter.

43 Claims, 13 Drawing Figures

SURFACE WAVE DEVICES

The invention herein described was made in the performance of work under a contract from the United States Air Force.

INTRODUCTION

This invention relates generally to devices for filtering, or otherwise handling, high frequency signals, and more particularly, to surface wave transducer devices utilizing a plurality of parallel grooves for appropriately filtering, or otherwise handling, the surface waves thereon.

BACKGROUND OF THE INVENTION

At relatively high frequencies, for example, near 200 MHz and higher, filters constructed from LC circuits tend to provide less than satisfactory results because of the low Q of the components utilized therein. Acoustic surface wave transducer filters wherein surface elastic waves are generated on a selected surface of suitable crystal substrates have been successfully employed in a number of signal processing devices, such as delay lines and filters. Such devices may utilize isotropic or anisotropic substrates and have found use in a number of communications and radar system applications.

DESCRIPTION OF THE PRIOR ART

A useful group of such surface wave devices have utilized configurations in which non-reflective interdigital electrodes are appropriately deposited on the surface thereof in a suitable metallic pattern for transducing electrical signals to surface elastic wave signals. Such non-reflective metallic patterns have often been placed on anisotropic materials such as piezoelectric substrates, as discussed in the article by Smith et al., "Analysis and Design of Dispersive Interdigital Surface-Wave Transducers," IEEE Trans. Microwave Theory Tech., Vol. MTT-20, July 1972. Such devices have been used to achieve matched filter characteristics as described by Tancrell et al., "Acoustic Surface Wave Filters," Proc. IEEE, Vol. 59, March 1971. Some of the problems arising from such devices are described by Jones et al., "Second Order Effects In Surface Wave Devices," IEEE Trans. Sonics Ultrasonics, Vol. SU-19, July 1972.

Devices using non-reflective, interdigital metallic deposits tend to be limited in their usefulness because of the short circuiting effect of metals on the substrate material, particularly piezoelectric surfaces, the acoustic losses incurred in propagation of the surface waves in the metal, and the mass loading of the metal on the piezoelectric surface. Such effects limit the fidelity of the filter operation.

In an effort to overcome such difficulties additional work has investigated the use of etched reflective gratings, or grooves, as contrasted with the use of non-reflective interdigital metallic deposits, to provide filtering action. An early device that has been suggested utilizes a plurality of parallel reflective grooves in a surface of a non-piezoelectric substrate having isotropic characteristics for providing matched filters. Such work has been described by Sittig et al., "Filters and Dispersive Delay Lines Using Repetitively Mismatched Ultrasonic Transmission Lines," IEEE Trans. Sonics Ultrasonics, Vol. SU-15, April 1968. Further work has achieved interactions between bulk elastic waves and grooves formed on the surface of thin isotropic substrates, as described by Martin in "The IMCON Pulse Compression Filter and Its Applications," IEEE Trans. MTT, April 1973.

The use of such etched reflective gratings in anisotropic media, such as piezoelectric crystal substrates, has also been described with reference to the fabrication of a dispersive delay line, i.e., a pulse compression filter, having a time-bandwidth product in excess of 1500, which device results in capacities beyond those achieved with non-reflective, interdigital transducer arrays. Such a device has been described by Williamson et al., "Large Time-Bandwidth Product Surface-Wave Pulse Compressor Employing Reflective Gratings," Electronics Letters, Vol. 8, No. 16, August 1972. In the latter device a surface wave is generated in the $z$ direction of the $y$ face of a lithium niobate crystal by an appropriate interdigital-electrode input transducer. The input surface wave then travels through an oblique grating comprising a first plurality of parallel etched grooves whose spacings increase as a function of the distance from the input transducer. The surface wave is first reflected in the $x$ direction by the first plurality of grooves and is further reflected by a second plurality of grooves symmetrically placed and arranged as a mirror-image of the first plurality of parallel grooves, which configuration thereupon conveys the surface wave to an appropriate interdigital-electrode output transducer. Such a device has been termed a "reflective array compressor" and achieves the desired pulse compression in a manner which is relatively free of the spurious signals which tend to limit the performance of interdigital transducer arrays. Such device, however, has been subject to phase errors inherent in the construction thereof.

DESCRIPTION OF THE INVENTION

The devices described in accordance with the concept of the invention utilize parallel reflective elements, such as grooves, in various configurations on any appropriate substrates which can carry surface waves. Unlike prior art devices using non-reflective interdigital electrodes which operate on the effects of electrostatic potentials which are present on piezoelectric devices, the devices of the invention using reflective elements operate on acoustic wave effects and, accordingly, are not limited to piezoelectric substrates. Such devices in certain embodiments of the invention provide bandpass filter operation, wherein the devices are provided with a capability of being designed for a specific center frequency, bandwidth, and response characteristics by an appropriate selection of the number, N, of parallel reflective elements utilized, the spacing between the elements, and at least one of the dimensions thereof. When such elements are grooves, for example, the selected dimensions are either the length L of the grooves or the depth $h$ thereof.

Further, in accordance with the concept of the invention, devices can be designed for achieving filter action wherein compensation can be made for phase errors which occur in surface wave devices, using either non-reflective interdigital element or reflective element configurations, such phase compensation being provided by the use of a varying width codncutive or non-conductive strip as described in more detail below.

The invention in its various aspects is described in more detail with the help of the accompanying drawings wherein FIG. 1 shows a perspective view of a surface wave transducer device for a reflective array compressor exemplifying the prior art;

Figure 1:
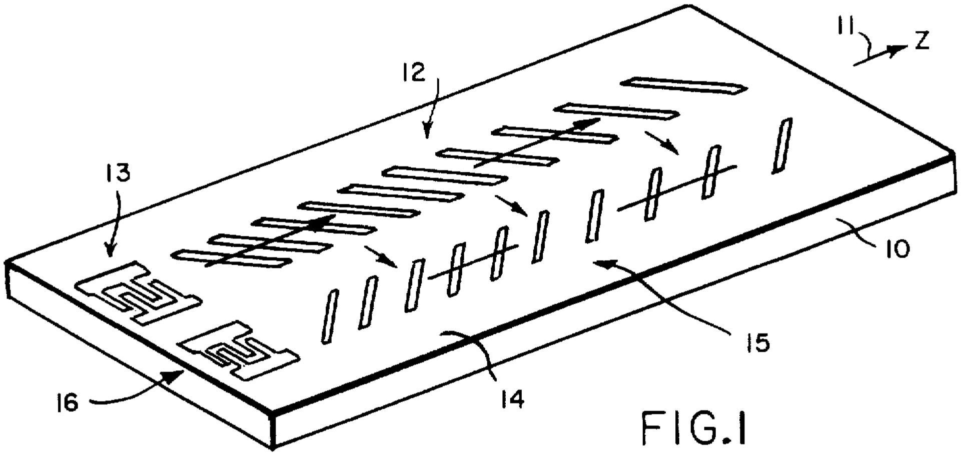

The prior art etched grating reflective array compressor shown in FIG. 1 is described in detail in the aforementioned Williamson et al. article and utilizes an anisotropic piezoelectric substrate 10 which, for example, may be a lithium niobate ($LiNbO_3$) crystal, the Z axis of which is along the direction of arrow 11. A first plurality of grooves 12 are etched along the Z axis direction, the spacings between the grooves increasing as a function of distance from an input transducer 13 as shown in the figure. The input transducer 13 is an interdigital electrode transducer well known to those in the art and is formed at the left end of the plurality of grooves in the view shown, the grooves and transducer being formed on the Y face 14 of substrate 10. A second plurality of grooves 15 which are, in effect, a mirror-image of the first plurality of grooves 12, are etched along the direction of the Z axis adjacent the first plurality of grooves. As with grooves 12, the spacing between grooves 15 gradually increases from the input transducer in the same manner. An output interdigital electrode transducer 16 is formed at the left end thereof just below input transducer 13, as shown.

As discussed in the Williamson et al. article, the surface wave is launched from the input transducer in the Z direction and is strongly reflective at a right angle in a region of the grooves where the groove spacing in the Z direction matches the wavelength of the surface wave. A second reflection in the symmetrically placed mirror-image plurality of grooves 15 sends the wave to the output transducer 16, the directions of propagation of the surface elastic wave being shown by the unnumbered arrows. The device is used as an effective dispersive delay line, or pulse compression filter, and is sometimes termed a reflective array compressor. The grooves as used therein have uniform lengths and variable depths, the latter being used to achieve a flat, or uniform amplitude impulse response.

Figure 2:
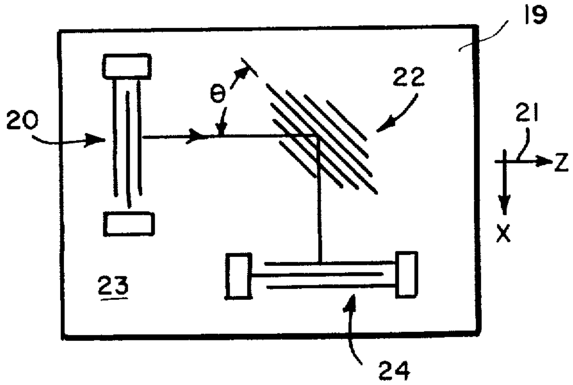
FIG. 2 shows a plan, schematic view of one embodiment of the invention for use as a bandpass filter using grooves of varying lengths.

While such a dispersive delay line, or pulse compressor, utilizing uniformly dimensioned grooves in a piezoelectric medium has been shown to provide effective operation, no one up to the time of this invention has utilized reflective elements, in either isotropic or anisotropic media, in order to handle surface waves for providing bandpass filter operation. FIG. 2 shows a configuration of the invention which produces a desired bandpass filtering action and uses an appropriate substrate media, such as a lithium niobate piezoelectric crystal. While the substrate, electrodes and grooves are of the general form shown in the perspective view of FIG. 1, the configuration is shown schematically in FIG. 2 as a plan view looking down at the grooves and electrode transducers from above the Y face of the crystal. In the bandpass configuration shown, the substrate 19 has an input transducer 20 placed at one end thereof so as to generate a surface wave along the Z axis direction shown by arrow 21. A plurality of parallel grooves 22 are etched at a portion of the surface, as shown, so that the spacing between the grooves is uniform and is equal to the wavelength of the surface wave which is to be subjected to the filtering action. The input electrode 20 and the grooves 22 are formed in the Y surface 23 of the crystal, as shown. The dimensions of one such crystal substrate, for example, which has been successfully used for the bandpass filtering action being described are 3.2 centimeters long (along the Z-axis), 1.9 centimeters wide (along the X-axis), and 0.15 centimeters thick.

To avoid effects of beam steering on filter performance, the Y surface of the crystal has to be closely perpendicular to the Y axis to within tolerances of about 0.1° while the Z axis is formed so as to be parallel to the long axis of the crystal, also within about 0.1°. In order to achieve right-angle reflection as shown in the figure the angle $\theta$ is chosen in accordance with the expression, $\tan\theta = v_{out}/v_{in}$ where $v_{in}$ and $v_{out}$ are the input, or incident, wave velocity and the output, or reflected wave velocity, respectively.

The metal film interdigital input transducer 20, as well as the output transducer 24, can be deposited on the surface by well-known techniques as by first coating the crystal surface with photoresist material, exposing the pattern on the photoresist material, and then irradiating the photoresist material so that it is dissolved away at all points where the pattern has not been exposed so that only the desired transducer pattern remains when the photoresist has been completely dissolved. Metal is then evaporated on to the remaining pattern, such metal being, for example, either 300 A of Cr followed by 1,000 A of Au or 300 A of Cr followed by 1,700 A of Al.

The reflector grooves 22 are etched in the surface by an appropriate ion beam sputtering process wherein the substrate is recoated with photoresist material and the reflector groove pattern is appropriately aligned within approximately 0.01° with the transducers, the pattern being thereupon exposed and etched out. The desired groove depth can be obtained by exposing the coated crystal to the ion beam, such as a neutral argon beam, for a predetermined length of time. In the embodiment of the transducer configuration of FIG. 2, the lengths of the grooves 22 are varied from groove to groove in accordance with a desired function. It has been found that variations of groove length in accordance with the Hamming function can achieve a practical filter having relatively low side lobe levels as desired. Thus, the groove length L can be expressed according to the Hamming function as follows:

$$L_J = 0.54 - 0.46 \cos [2\pi(J-1)/(N-1)]$$

where $J = 1, 2 \ldots, N$, and $L_J$ is the length of the Jth groove and N is the total number of grooves. One filter of this type which has been successfully constructed utilizes 39 grooves in the reflector groove pattern 22 with 5 finger pairs in the input transducer 20 and 10 finger pairs in the output transducer 24. Such a device, accordingly, has a center frequency of 203.9 MHz and 3dB bandwidth of 6.9 MHz.

Substantial reduction of distortion in the operation of the device can be achieved by making the depth h of the grooves less than about 1 percent of the wavelength λ of the surface elastic wave.

As can be seen, the reflector grooves are oriented at an angle θ with respect to the surface wave direction of propagation (in this case the Z-axis) from input transducer 20. In one embodiment $\theta = 46.81°$. The input and output transducers both have bandwidths greater than 50 MHz so that all of the filtering occurs at the reflector grooves. For the frequency response discussed above, the groove depth is 0.45 microns and is uniform from groove to groove.

In general the number of grooves determines the sharpness of the filter response. Accordingly, for relatively sharp response, the number of grooves preferably should be at least twice the response of the bandwidth percentage of the center frequency (i.e., $N \geq 2/BW$ percent). Thus, for a bandwidth of 1 percent of the center frequency, it is preferable that the total number of grooves be at least 200 for relatively sharp filter response.

Figure 2A:
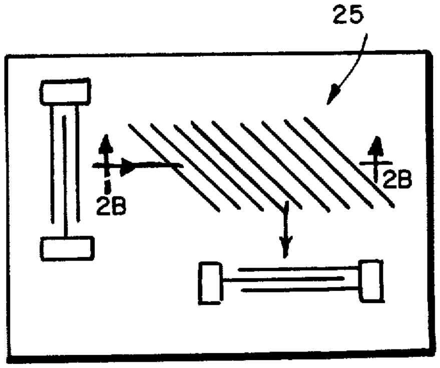
FIGS. 2A and 2B show a plan, schematic view and a partial view in cross-section of an alternative embodiment of the invention using grooves of varying depths.
Figure 2B:
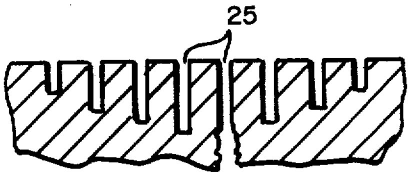

It has been found that for relatively narrow fractional bandwidth filters, that is, where the bandwidth is less than 0.5 percent of the center frequency (e.g., a bandwidth of 1 MHz at a 200 MHz center frequency, for example), the construction of length weighted reflector grooves of uniform depth requires a relatively large number of grooves (at least 400 grooves and preferably as high as 1,000 in some applications). Alternatively, it is possible to weight the reflectivity by using grooves of uniform width and varying the depths of the grooves rather than by using uniform depths and varying their lengths. One such filter has been achieved by utilizing grooves 25 of uniform length and uniform spacing therebetween, as shown in FIG. 2A, with varying depths from groove to groove, as shown in FIG. 2B. One such successful filter has utilized 77 grooves of uniform length with appropriate depth weighting achieved during the ion beam etching by passing the crystal under a narrow slit with a drive programmed to give an exposure versus distance porportional to the above-mentioned Hamming function. The maximum depth is 0.29 microns.

Figure 2C:
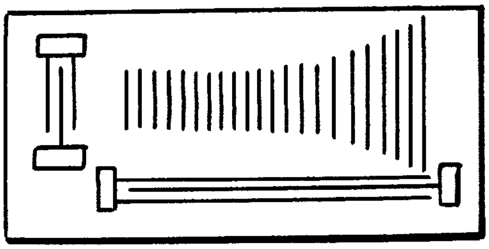
FIG. 2C shows an alternative structure for the grooves used in the invention.

In operation the surface wave propagated on such devices incurs energy losses as it is propagated along the grooves, such losses arising from beam dispersion, i.e., spreading of the beam beyond the groove ends, propagation losses due to the substrate material, and signal losses due to the progressive reflections along the groove array. Compensation for such losses can be achieved by changing the reflectivity of the grooves either by increasing the lengths or depths as required. Thus, as shown in the depth weighted configuration of FIG. 2C, the lengths of the grooves in FIG. 2A can be lengthened progressively, for example, in accordance with the general beam dispersion characteristics as shown. Alternatively, in a length weighted configuration the depths of the grooves can be increased progressively. Such compensation can also be arranged to take care of losses that may be incurred in the input and output transducers as well as the losses discussed above.

Figure 3:
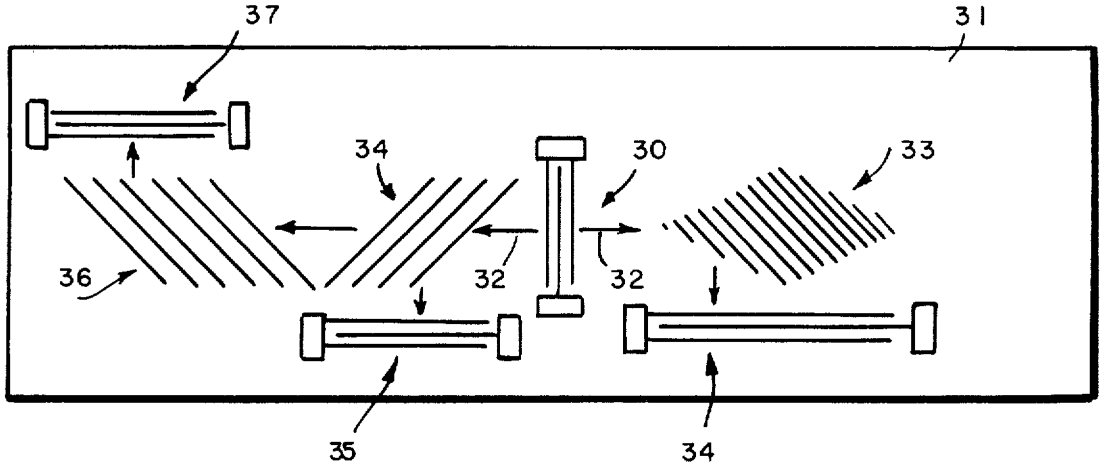
FIG. 3 shows a plan, schematic view of another embodiment of the invention in the form of a single bounce, or single reflection, filter bank configuration.

FIGS. 2, 2A and 2B have depicted bandpass filters for providing a single bandpass output signal having a predetermined center frequency and bandwidth. FIG. 3 shows an extension of such concept wherein the crystal substrate can be arranged with a plurality of sets of grooves for providing a filter bank wherein a plurality of frequencies of an input signal may be subjected to filtering action, each filter having its own predetermined center frequency and bandwidth. Such a configuration is shown in FIG. 3 wherein an input signal comprising a plurality of frequencies may be inserted at input transducer 30, which transducer is substantially centrally placed in the Y surface of the crystal 31 so that surface waves are generated in opposite directions along the Z axis, as shown by arrows 32. A first filter comprising a plurality of grooves 33 in which the grooves have varying lengths, as in FIG. 2, is utilized to produce a filtering action for providing an output signal having a predetermined center frequency and bandwidth at output transducer 34.

A second filter utilizing a plurality of uniform length grooves 34, which grooves are appropriately depth weighted in accordance with the configuration discussed with reference to FIGS. 2A and 2B, provides an output signal at output transducer 35. A further filtering action may be provided by an additional filter comprising a plurality of grooves 36, also of uniform length and weighted in depth, arranged to produce an output signal having a different center frequency and bandwidth at output transducer 37. The concept of such a filter bank obviously can be extended to produce any desired number of different frequencies along the substrate. The configuration shown in FIG. 3 may be effectively described as using "single bounce," or single reflection, filter operation wherein the input signal is reflected only once from a particular set of grooves to the output transducers involved.

Figure 4:
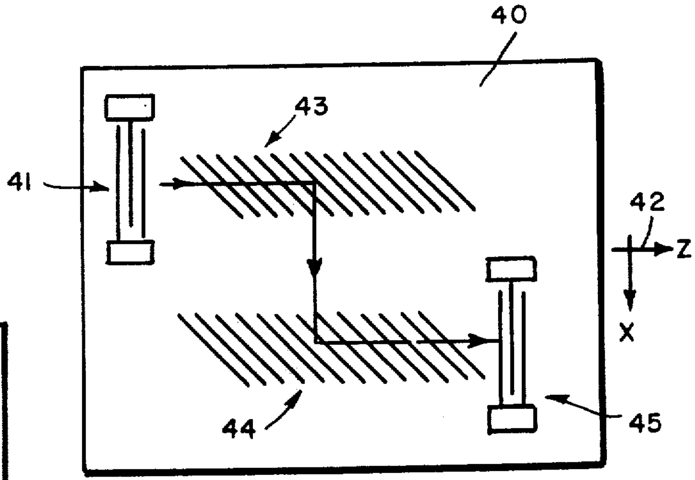
FIG. 4 shows a plan, schematic view of another embodiment of the invention utilizing a double bounce, or double reflection, configuration having uniform spacing between grooves.

An alternate configuration utilizing a so-called "double-bounce", or double reflection, configuration is shown in a first relatively simplified form in FIG. 4 wherein a substrate 40 has deposited thereon an input transducer 41 for generating a signal along the Z axis thereof in the direction of arrow 42. A first set of reflector grooves 43 are formed along the Z axis, as shown, such grooves having uniform spacing therebetween, as discussed above. A second set of reflector grooves 44 essentially parallel to and identical in configuration to grooves 43 are formed below grooves 43 along the Z axis and have the same uniform spacing as grooves 43. An output transducer 45 provides the output signal as reflected thereto from the second set of grooves 44. In each case the depths of the grooves 43 and 44 may be varied and the lengths made uniform as discussed above so that the desired center frequency and bandwidth are achieved. Alternatively, the lengths may be varied and the depths made uniform to achieve the same purpose, as discussed above.

The configuration shown in FIG. 4 can be classified as a double bounce filter wherein the input signal is first reflected from the set of parallel grooves 43 to the set of parallel grooves 44 where it is thence reflected a second time to output transducer 45. It has been found that such double bounce configurations permit the fabrication of filters having relatively wide bandwidths.

Although, as discussed above, both the groove sets 43 and 44 may be arranged to use uniform lengths with varying depths, or vice-versa, in some applications it may be desirable to utilize both uniform lengths and depths for one of the pair of groove sets, the other set providing the desired filtering action by using either the length-weighted or depth-weighted configurations. Further, although the pair of groove sets are shown as providing a forward second reflection, the groove set 44 may also be arranged to have a mirror-image orientation as groove set 43 to provide a backward second reflection if desired. The use of the latter configuration provides, for a fixed beam width, an impulse response which is longer in time than that achieved by the configuration shown in FIG. 4.

Figure 5:
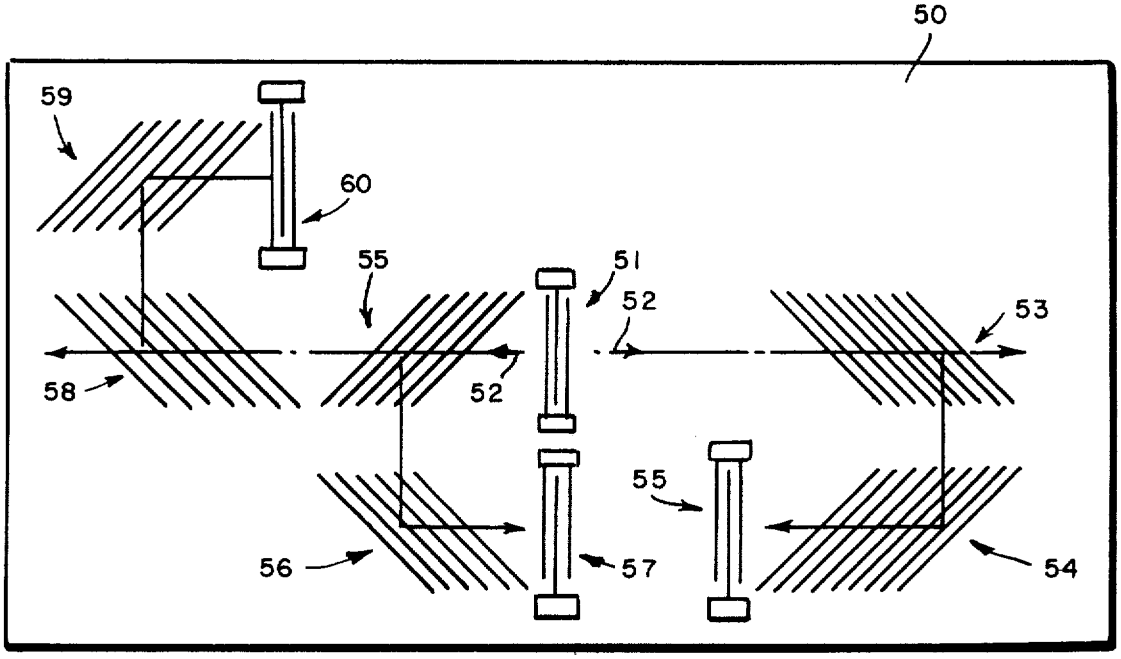
FIG. 5 shows a plan, schematic view of another embodiment of the invention depicting a filter bank utilizing a double bounce configuration.

Analagously to the single bounce configuration, the double bounce configuration can also be utilized to provide a suitable filter bank wherein a plurality of pairs of filter groove sets can be formed on a single substrate. Such a configuration is shown in FIG. 5 which in its simplified form utilizes a number of reflector group pairs for each frequency to provide the double bounce action. Thus, an input transducer 51 is formed substantially in a central location on the Y surface of a substrate 50 to produce input signals generated in opposite directions along the Z axis as shown by arrows 52.

A first pair of reflector groove sets 53 and 54 are arranged as shown to provide a first filtered signal at output transducer 55 and, as can be seen, the output signal is obtained by a double reflection, first from the reflector groove set 53 and second from reflector groove set 54.

A second pair of reflector groove sets 55 and 56 produce an output signal at output transducer 57. A third group of reflector groove sets 58 and 59 supply an output signal at output transducer 60. Groove spacings and groove depths are arranged as discussed above to produce the desired center frequency and bandwidths for each of the filter signals supplied at the output transducers. Although the groove set pairs utilize uniform groove lengths and varying groove depths, it is clear that the depths may be made uniform and the lengths varied as required. Accordingly, the overall substrate 50 can then be utilized as a suitable filter bank which, in each case, provides double bounce operation with respect to the reflector groove sets involved. Appropriate combinations of single bounce and double bounce filters may also be formed on the same substrate if desired in a particular application.

In order to obtain a desired bandpass characteristic, i.e., in order to shape the frequency response, it is possible to provide for phase reversals at appropriate points along the reflective groove array. For example, suitably positioned phase reversals can be used to produce sharper edges for the bandpass response, i.e., to produce a rectangular bandpass characteristic. Such phase reversals are obtained by changing the spacing between selected pairs of adjacent grooves in a uniformly spaced groove array from a spacing of $\lambda$ to a spacing of $\lambda/2$ /2 (i.e., a 180° phase shift). Such appropriately placed phase reversals can be used in either a single bounce or a double bounce configuration.

Figure 6:
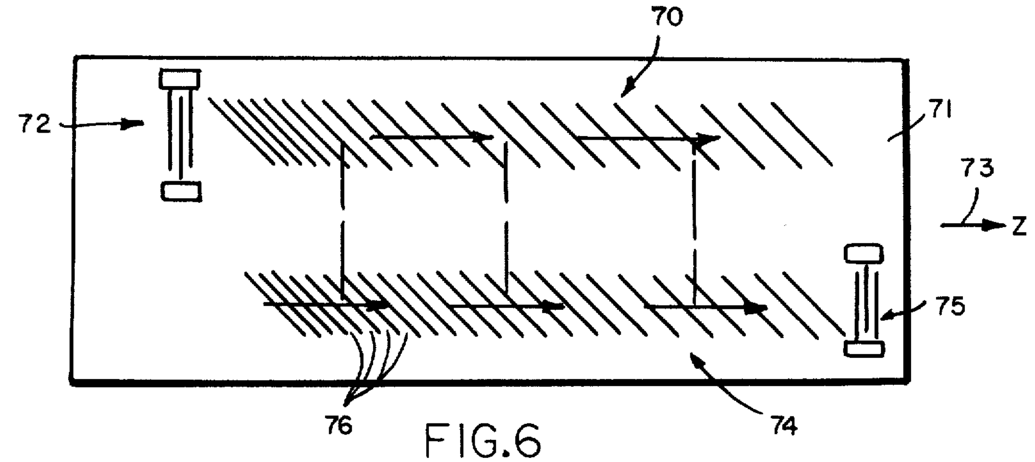
FIG. 6 shows a plan, schematic view of another embodiment of the invention depicting a double bounce configuration for bandpass filter operation utilizing variable spacing between the grooves.

FIG. 6 shows a double bounce configuration for use as an alternative structure for providing bandpass filter operation wherein variable spacing grooves are used with uniform groove lengths and depths. As seen therein, a first set of grooves 70 is formed in the Y face of a suitable substrate 71. An input interdigital transducer 72 generates a surface wave which is caused to propagate in the Z direction, shown by arrow 73, which wave is thereby reflected substantially perpendicularly toward a second set of grooves 74 from whence they are reflected toward an output transducer 75. The grooves of each set are arranged so that the spacing 76 therebetween gradually increases along the Z direction as a function of the distance from the input transducer. Both sets of grooves are arranged with identically varying spacings and, unlike the variable spacing pulse compression device of FIG. 1, the orientation of the second set is identical to the first set so that a forward reflection occurs in the Z direction. Appropriate arrangement of the spacing permits a suitable bandpass filtering action and will determine the frequencies that are reflected at each set so as to achieve a particular center frequency and bandwidth, as desired. Since the time of travel from the input to the output transducer for all frequencies that are reflected is the same, an effective bandpass operation is obtained. Such operation is contrasted with the device of FIG. 1 wherein, because of the mirror image groove configuration, the time of travel for all frequencies that are reflected differs (i.e., higher frequency signals travel shorter paths, while shorter frequency signals travel longer paths) in order to achieve the pulse compression operation desired therein.

Figure 7:
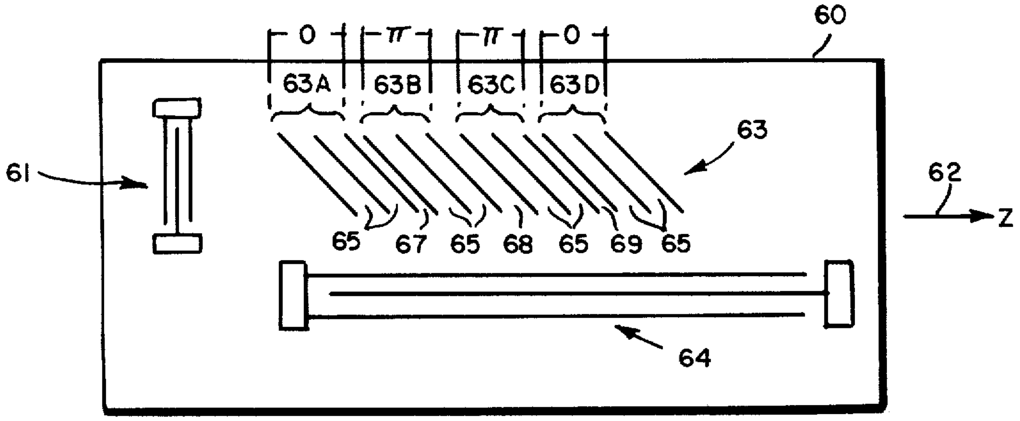
FIG. 7 shows a plan, schematic view of another embodiment of the invention depicting a phase coded matched filter configuration.

FIG. 7 depicts still another filter embodiment utilizing the principles of the invention wherein a phase encoded matched filter can be made, utilizing groups of parallel spaced grooves, wherein each group of grooves is displaced by a specified amount from its adjacent group or groups for introducing a desired delay or phase shift. Thus, a substrate 60 has formed thereon an input transducer 61 for supplying a surface wave along the Z axis, as indicated by arrow 62 toward a plurality of reflector grooves designated generally by reference numeral 63 and arranged as described in more detail below. An output transducer 64 is formed to provide an output signal which represents the reflected signal energy received from grooves 63. In order to produce an appropriate phase encoded signal, the grooves are arranged in groups, each group of which provides a signal energy at a particular phase which may differ from the phase of the signal energy reflected by another group. Thus, a first group of reflector grooves 63A is arranged so as to have uniform spacing 65 therebetween, which group provides reflected energy having a particular phase, arbitrarily designaged in the figure as a zero phase. The spacing 65 between grooves 63A is equal to the wavelength, $\lambda$, of the energy of the surface wave signal reflected therefrom.

In a bi-phase encoded system the next adjacent group of grooves 63B is arranged to have the same uniform spacing 65 therebetween and for a particular code may require energy reflected in the opposite, or $\pi$, phase of a bi-phase code, in which case the group of grooves 63B is separated from the group of grooves 63A by a spacing 67 equal to $\lambda/2$.

If the next adjacent phase desired is also a $\pi$ phase, the next adjacent group 63C is spaced from group 63B by a spacing 68 equal to a full wave length so that no phase change occurs from group 63B to group 63C with the spacing 65 between each of the grooves 63C also being uniformly equal to $\lambda$. In the specific example shown, the final phase is depicted as having a zero phase so that group 63D is separated from group 63C by a spacing 69 equal to $\lambda/2$ so that a phase change occurs from group 63C to group 63D with a uniform spacing 65 between each of the grooves 63D also being equal to $\lambda$. Accordingly, in the example shown for a four bit, bi-phase system (i.e., either zero phase or $\pi$ phase), each bit (represented by the entire four groups) is comprised of four chips 63A, 63B, 63C and 63D to produce the appropriately phase encoded signal at output transducer 64. Multiphase versions of the phase encoded embodiment of the invention may also be designed with the spacing between each chip being arranged as an appropriate function of the wavelength $\lambda$ as desired. While shown in a single bounce configuration, the phase coded matched filter operation can also be achieved using a double bounce configuration.

Figure 8:
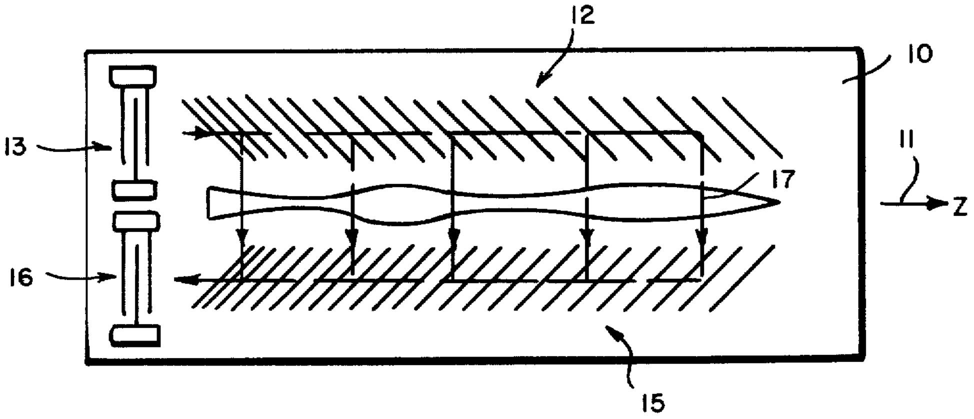
FIG. 8 shows a plan, schematic view of another embodiment of the invention depicting the reflective array compressor of FIG. 1 with an inventive improvement for providing phase compensation therein.

FIG. 8 depicts a unique structure for compensating for phase errors in the operation of the pulse compressor filter used by the prior art and depicted in FIG. 1. Such phase errors generally can arise from various effects, such as dispersion of the surface wave pattern generator errors.

In accordance with the invention described herein it is now possible to reduce the errors due to such effects in filter devices in a novel and relatively simple and inexpensive manner.

Such a phase compensated structure is shown in FIG. 8 wherein a plan, schematic view of the configuration of the reflective array compressor system of FIG. 1 is reproduced, utilizing the same reference numerals as set forth in the latter figure. The structure, however, differs from the structure of FIG. 1 in that, in a preferred embodiment thereof, a conducting film, or layer, 17 is deposited on the Y surface of the substrate 10 between the first plurality of grooves 12 and the second plurality of grooves 15. The velocity of a surface elastic wave is reduced as the wave travels through a conductive film placed in its path. The change in the velocity $\Delta\nu$ depends on the distance traveled through the conducting film. Further, the wave travels through the conductive film without the introduction of any attenuation thereof. Accordingly, if any surface elastic wave traverses a path W, which is covered by such conductive film or layer, the change in phase $\Delta\Phi$ of the wave relative to a wave propagated in the absence of such a conductive film or layer will be advanced in accordance with the following equation:

$$\Delta\Phi = 2\pi \frac{\frac{\Delta\nu}{2}}{\nu_o} W f$$

where $\Delta\nu$ is the velocity shift, $V_0$ is the unperturbed velocity in the absence of such a shift, W is the width of the conducting layer and $f$ is the frequency of the wave.

Thus, in the device shown in FIG. 8 utilizing variable spacing grooves, for each frequency $f$ there is a different position along the Z axis $[Z(f)]$ at which the surface wave is reflected. The width W(Z) of the conducting layer 17 at the distance Z is adjusted to compensate for the phase error at the corresponding frequency as measured in the absence of such conducting film or layer. Thus, the uncompensated phase response is first measured and the width of the conducting film is then calculated in order to provide the appropriate phase compensation therefor, the conducting film then being deposited with the desired varying widths along the Z axis as shown in the exemplary conducting film 17 of FIG. 8. The thickness of the layer is relatively uncritical when using a conductive film so long as enough metal is used to achieve conductivity and so long as the layer is not so thick as to produce an undesirable mass loading of the metal on the substrate. A thickness of about 200 A or greater is effective, up to as thick as 1000 A, or more, the latter limit depending on the frequency involved.

Alternatively, a non-conductive, or insulative, layer may be used for such purpose instead of the conductive layer 17. Such an insulative layer may be made of silicon dioxide, for example, or other material which is useful in changing the velocity of a surface wave. The thickness thereof depends upon the elastic properties of the material and the thickness and widths thereof can be determined empirically for the particular frequencies and phase shifts required. Since, unlike the conductive layer, the thickness of the non-conductive material, together with its width, (in effect, its mass and volume) will determine the wave velocity change that is produced, it is possible in some applications to use a non-conductive layer of uniform width and varying thickness, of uniform thickness and varying width, or a combination of both.

The compensated pulse performance achieved with reflective array compressors is significantly improved from those achieved with the devices discussed in the above article of Williamson et al. and not only the near-in side lobes but also the far-out side lobes are reduced considerably over those previously obtained.

While such compensation technique is described with reference to the pulse compressor filter of FIG. 8, it can also be used in essentially the same manner to compensate for phase errors in the bandpass filters described in the prior figures, such compensating strip of material being positioned between a reflector array and an output transducer in a single bounce configuration or between reflector arrays in a double bounce configuration. Further, such compensation technique can be used to correct phase errors which arise in the surface wave device but may also be used to correct phase errors that arise in other components of a system in which the device is used, which components contribute to the signal at the input to the surface wave device.

Analogous to the above phase error compensation and as a further alternative embodiment of the above discussed length-weighted and depth-weighted configurations, it is possible to achieve a desired amplitude response by using a strip of energy absorbing material (e.g., a rubber cement material) so as to selectively absorb energy along the reflective array and, thus, produce a desired output amplitude response. The absorption, for example, will depend on the amount of material (e.g., the width of the strip) encountered by the reflected surface wave.

Figure 9:
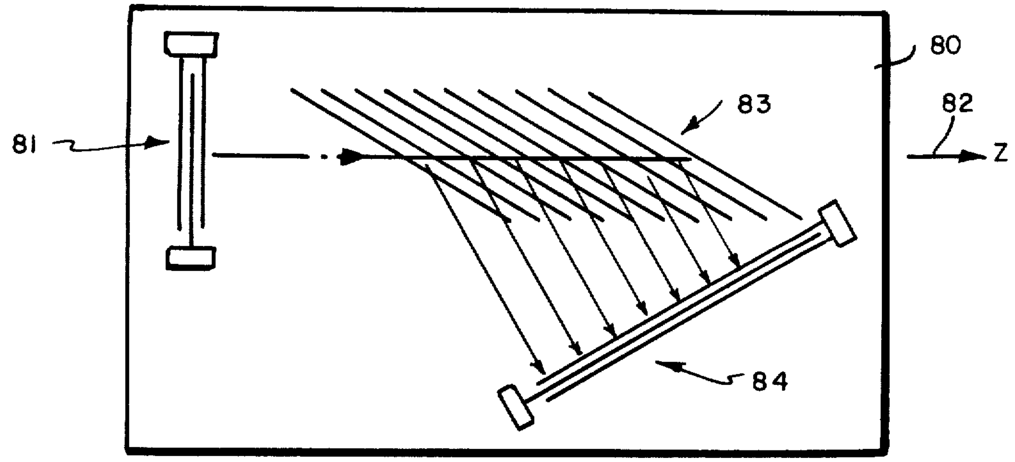
FIGS. 9 and 9A show plan, schematic views of other embodiments of the invention depicting the use of a reflective groove arranged to provide other than a right angle reflection therefrom.
Figure 9A:
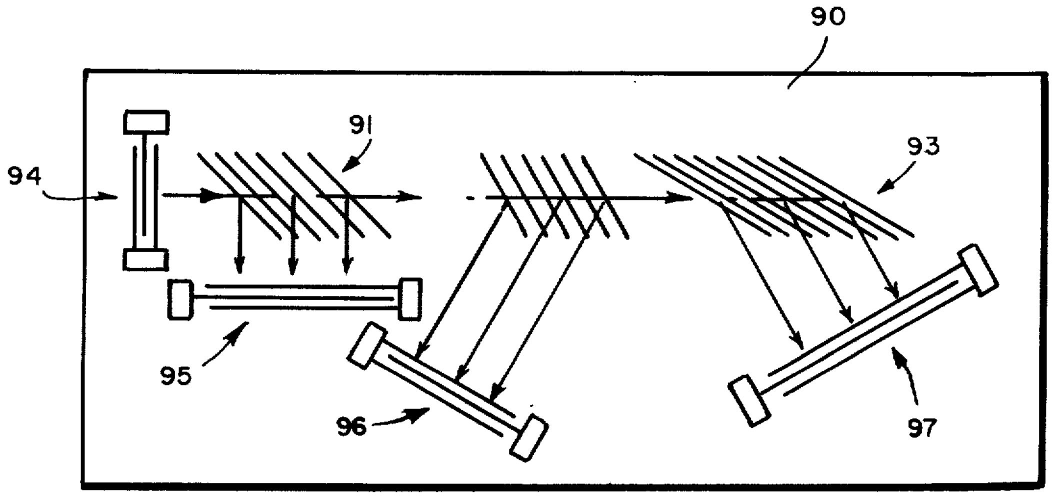

FIG. 9 shows a further alternative embodiment of the invention wherein the center frequency of a bandpass filter may be varied by changing the angle of incidence to produce reflections at an angle other than a right angle. Thus, a substrate 80 has an input interdigital transducer 81 which propagates a surface elastic wave along the Z axis, as shown by arrow 82. A reflective array of parallel grooves 83 are positioned along the direction of propagation at an orientation such that the wave reflected therefrom is reflected at an angle other than a right angle, e.g., an angle larger than a right angle, as shown. An output interdigital transducer 84 is positioned at the appropriate orientation to receive the reflected wave. Thus, for a bandpass filter having a selected bandwidth, center frequency and response characteristic when using a particular groove array arranged for a right-angle reflection, the center frequency thereof can be changed by changing the angle of incidence and reflection is shown in FIG. 9. The significance of such effect can be understood with the realization that the generation of a particular desired array pattern is difficult and expensive and the need to use different patterns to achieve different center frequencies in a filter bank, as shown in FIG. 9A for example, can raise the cost of the filter bank prohibitively. Thus, a substrate 90 has a plurality of groove arrays 91, 92, 93 supplied by a wave from input transducer 94. Each array is at a different angle from the other, grooves 91 providing a right angle reflection, grooves 92 providing a reflection at less than a right angle, and grooves 93 a reflection at more than a right angle. Although the grooves in each case may be depth weighted in accordance with the same pattern, the output center frequencies of the reflected waves supplied to output transducers 95, 96 and 97 are different, the values thereof depending on the angle of incidence and reflection at each of the groove arrays. However, the costs thereof can be held to a reasonable level by using the same pattern for each center frequency of the filter bank and merely orienting the angle of incidence of each pattern array to produce the desired output center frequency at each location.

While all of the above configurations have been described specifically as using reflective grooves it is possible to substitute any appropriate reflective elements to achieve the desired reflections. Thus, parallel deposits of metal may be used instead of grooves. Any other elements may be used so long as they produce local changes in the elastic properties of the substrate material which couple to the surface wave so as to produce reflections thereof. Further, input and output transducer means other than interdigital forms thereof may be used.

Accordingly, the invention is not to be construed as necessarily limited to the above embodiments inasmuch as others may occur to those in the art within the spirit and scope of the invention. Hence, the invention is not to be limited except as defined by the appended claims.

What is claimed is:

1. A device for handling surface elastic waves comprising a substrate capable of propagating surface elastic waves having a selected direction of propagation on a selected surface thereof;

first transducer means formed on said surface for generating surface elastic waves on said surface in said direction;

at least one set of parallel reflective elements having preselected dimensions being formed at said surface and arranged at a preselected angle of incidence to the direction of propagation of said surface elastic waves to provide a reflection of said surface elastic waves at a preselected angle of reflection;

at least one of the dimensions of said reflective elements arranged to vary in a predetermined manner from element to element for achieving a non-linear relationship between the path length of said surface elastic wave and the frequency of said wave to provide a filtering action for said reflected surface elastic wave; and second transducer means formed on said surface for receiving said reflected and filtered surface elastic waves.

2. A device in accordance with claim 1 wherein said reflective elements are grooves and the lengths of said grooves are varied in a predetermined manner from groove to groove.

3. A device in accordance with claim 1 wherein said reflective elements are grooves and the depths of said grooves are varied in a predetermined manner from groove to groove.

4. A device in accordance with claim 1 wherein a plurality of sets of said parallel reflective elements are formed in said surface, one of the dimensions of said reflective elements in each set thereof being varied in a predetermined manner from element to element to produce a plurality of reflected and filtered surface elastic waves; and said second transducer means comprises a plurality of receiver transducer means, each formed on said surface to separately receive one of said plurality of reflected and filtered surface waves.

5. A device in accordance with claim 4 wherein said reflective elements are grooves and the lengths of said grooves are varied in a predetermined manner from groove to groove.

6. A device in accordance with claim 4 wherein said reflective elements are grooves and the depths of said grooves are varied in a predetermined manner from groove to groove.

7. A device for handling surface elastic waves comprising a substrate capable of propagating surface elastic waves on a surface thereof;

first transducer means formed on said surface for generating surface elastic waves on said surface;

a first set of parallel reflective elements having uniform spacing therebetween and preselected dimensions formed at said surface and arranged at a preselected angle of incidence to the direction of propagation of said surface elastic waves to provide a first reflection of said surface elastic waves at a first preselected angle of reflection;

a second set of parallel reflective elements having uniform spacing therebetween and preselected dimensions formed in said surface adjacent said first set of grooves and arranged at a preselected angle of incidence to the direction of propagation of said surface elastic waves reflected from said first set of parallel reflective elements to provide a second reflection of said first reflected surface elastic waves at a second preselected angle of reflection; and
second transducer means formed on said surface for receiving said second reflected surface elastic waves.

8. A device in accordance with claim 7 wherein said reflective elements are grooves and at least one of said dimensions of the grooves in at least one of said sets are varied in a predetermined manner from groove to groove.

9. A device in accordance with claim 8 wherein said reflective elements are grooves and the depths of the grooves in at least one of said sets are varied in a predetermined manner from grooves to groove.

10. A device in accordance with claim 8 wherein the lengths of the grooves in at least one of said sets are varied in a predetermined manner from groove to groove.

11. A device in accordance with claim 7 wherein said reflective elements are grooves and the grooves of said second set of grooves are parallel to the grooves of said first set of grooves whereby the second reflection is in said direction of propagation.

12. A device in accordance with claim 7 wherein said second set of grooves is a mirror-image of said first set of grooves whereby the second reflection is in a direction opposite to said direction of propagation.

13. A device for handling surface elastic waves comprising
a substrate capable of propagating surface elastic waves on a surface thereof;
first transducer means formed on said surface for generating surface elastic waves having a selected direction of propagation on said surface;
a plurality of first sets of parallel reflective elements formed at said surface, the elements in each of said first sets having preselected dimensions and arranged at a preselected angle of incidence to the direction of propagation of said surface elastic waves to provide a first reflection of said surface elastic waves at a first preselected angle of reflection;
at least one of said dimensions of at least one of said plurality of first sets of reflective elements being arranged to vary in a predetermined manner from element to element to provide a filtering action for said first reflected surface elastic wave;
a plurality of second sets of parallel reflective elements the elements in each of said second sets having preselected dimensions and being formed at said surface, each set being formed adjacent one of said first sets of reflective elements and arranged at a preselected angle of incidence to the direction of propagation of the surface elastic waves reflected from said adjacent one of said first set of reflective elements to provide a second reflection of said surface elastic waves at a second preselected angle of reflection; and
a plurality of receiving transducer means each receiving one of said second reflected surface elastic waves from one of said plurality of second sets of parallel reflective elements.

14. A device in accordance with claim 13 wherein at least one of said dimensions of at least one of said plurality of second sets of parallel reflective elements is arranged to vary in a predetermined manner from element to element to provide a filtering action for said second reflected surface elastic waves.

15. A device in accordance with claim 13 wherein said reflective elements are grooves and the lengths of at least one of said plurality of first sets of parallel grooves are varied.

16. A device in accordance with claim 13 wherein said reflective elements are grooves and the depths of at least one of said plurality of first sets of parallel grooves are varied.

17. A device in accordance with claim 14 wherein said reflective elements are grooves and the lengths of at least one of said plurality of second sets of parallel grooves are varied.

18. A device in accordance with claim 14 wherein said reflective elements are grooves and the depths of at least one of said plurality of second sets of parallel grooves are varied.

19. A device for handling surface elastic waves comprising
a substrate capable of propagating surface elastic waves on a surface thereof;
first transducer means formed on said surface for generating surface elastic waves on said surface;
a first set of parallel reflective elements having substantially uniform dimensions formed at said surface and arranged at a preselected angle of incidence to the direction of propagation of said surface elastic waves to provide a first reflection of said surface elastic waves at a first preselected angle of reflection, the spacing between said reflective elements varying in a predetermined manner;
a second set of parallel reflective elements having substantially uniform dimensions formed in said surface adjacent said first set of reflective elements and arranged so that all of the reflective elements of said second set are parallel to the reflective elements of said first set so as to present a preselected angle of incidence to the surface elastic waves reflected from said first set to provide a second reflection of said first reflected surface elastic waves at a second preselected angle of reflection, the spacing between the reflective elements of said second set varying in substantially the same predetermined manner as the spacing of said first set; and
second transducer means formed on said surface for receiving said second reflected surface elastic waves.

20. A device in accordance with claim 19 wherein said reflective elements are grooves and the spacing between the grooves in each of said first and second sets varies in accordance with the distance of said grooves from said first transducer means along said direction of propagation.

21. A device for handling surface elastic waves to provide a phase-coded filtering action over a specified bandwidth comprising
a substrate capable of propagating surface elastic waves having a preselected direction of propagation on a surface thereof;
input transducer means formed on said surface for generating surface elastic waves on said surface in said direction;
a set of parallel reflective elements formed in said surface and arranged at a preselected angle of incidence to said direction of propagation, said set comprising a plurality of separate groups of said reflective elements, the spacing between the reflective elements in each group being uniform and the number of reflective elements within each said group being selected to provide a response over said specified bandwidth, and the spacing between each group having one of a plurality of selected values, for producing a plurality of reflected surface elastic waves, each at a preselected angle of reflection, each of said values selected to introduce a predetermined phase-shaft for said reflected surface elastic waves; and output transducer means formed on said surface and responsive to said plurality of reflected surface elastic waves for producing a plurality of electrical signals and for adding said electrical signals to provide a matched filter operation.

22. A device in accordance with claim 21 wherein said reflective elements are grooves.

23. A device in accordance with claim 21 wherein the spacing between each group has one of more than two selected values for providing multiphase coded operation.

24. A device in accordance with claim 21 wherein said uniform spacing between the elements in each group is approximately equal to one wavelength of said surface elastic wave and the spacing between each group is one of two selected values which are approximately equal to one-half wavelength and one wavelength, respectively, of said surface elastic wave.

25. A device for handling surface elastic waves comprising a substrate capable of propagating surface elastic waves having a preselected direction of propagation on a surface thereof;

first transducer means formed on said surface for generating surface elastic waves on said surface in said direction;

at least one plurality of parallel reflective elements formed at said surface and arranged at a preselected angle of incidence to said direction to provide a reflection of said surface elastic wave at a preselected angle of reflection;

second transducer means for receiving said reflected surface elastic wave; and a layer of preselected material deposited on said surface in the path of said reflected wave, a dimension of said layer arranged so as to vary from one end to the other of said plurality of reflective elements to vary the velocity of the reflective wave from said one end to the other to adjust the phases of the reflected components of said surface elastic wave received at said second transducer means.

26. A device in accordance with claim 25 wherein said layer is conductive and said dimension is the width thereof.

27. A device in accordance with claim 26 wherein said layer is at least 200 A thick.

28. A device in accordance with claim 27 wherein the thickness of said layer is not greater than that thickness which would introduce excessive mass loading of said substrate.

29. A device in accordance with claim 25 wherein said layer is non-conductive and said dimension is the width thereof.

30. A device in accordance with claim 25 wherein said layer is non-conductive and said dimension is the thickness thereof.

31. A device for handling surface elastic waves comprising a substrate capable of propagating surface elastic waves having a preselected direction of propagation on a surface thereof;

first transducer means formed on said surface for generating surface elastic waves on said surface in said direction;

a first plurality of parallel reflective elements formed in said surface and arranged at a preselected angle of incidence to said direction of propagation to provide a first reflection of said surface elastic waves at a first preselected angle of reflection;

a second plurality of parallel reflective elements adjacent said first plurality of parallel reflective elements formed at said surface to provide a second reflection of said first reflected surface elastic waves at a second preselected angle of reflection;

second transducer means for receiving said second reflected surface elastic waves from said second plurality of reflective elements; and a layer of preselected material deposited on said surface along the region between said first and said second plurality of parallel reflective elements, a dimension of said layer being arranged to vary so as to change the velocity of the surface elastic wave reflected from said first plurality of reflective elements through said layer to said second plurality of reflective elements substantially from one end to the other of said first plurality of reflective elements to adjust the phase of said surface elastic waves received at said second transducer means.

32. A device in accordance with claim 31 wherein said layer is conductive and said dimension is the width thereof.

33. A device in accordance with claim 31 wherein said layer is non-conductive and said dimension is the width thereof.

34. A device in accordance with claim 31 wherein said layer is non-conductive and said dimension is the thickness thereof.

35. A device in accordance with claim 1 wherein the lengths of at least some of said reflective elements are progressively increased in the direction of propagation to compensate for energy losses incurred by said surface elastic wave as it is propagated along said set of reflective elements.

36. A device in accordance with claim 1 where the spacing between selected adjacent ones of said reflective elements are approximately equal to one-half the wavelength of the surface elastic wave propagated along said reflective elements to provide phase reversals at selected regions of reflection along said set, the spacing between adjacent ones of the remaining said elements being approximately equal to one wavelenth of said surface elastic wave.

37. A device for handling surface elastic waves comprising a substrate capable of propagating surface elastic waves having a preselected direction of propagation on a surface thereof;

first transducer means formed on said surface for generating surface elastic waves on said surface in said direction;

at least one plurality of parallel reflective elements formed at said surface and arranged at a preselected angle of incidence to said direction to provide a reflection of said surface elastic wave at a preselected angle of reflection;

second transducer means for receiving said reflected surface elastic wave; and a layer of preselected energy absorbing material deposited on said surface in the path of said reflected wave, a dimension of said layer arranged so as to vary from one end to the other of said reflective elements to vary the amplitude from said one end to the other of the reflected components of said surface elastic wave received at said second transducer means.

38. A device in accordance with claim 1 wherein said preselected angles of incidence and reflection are arranged to provide a right angle reflection of said surface elastic waves at said set of parallel reflective elements.

39. A device in accordance with claim 1 wherein said preselected angles of incidence and reflection are arranged to provide a reflection of said surface elastic waves at said set of parallel reflective elements which is other than a right angle.

40. A device in accordance with claim 4 wherein the dimensions of each set of said reflective elements are varied in the same predetermined manner and the preselected angles of incidence and reflection are different for each said set so that surface elastic waves are reflected at different angles at each said set, the center frequency of the filtered waves at each said set thereby being different.

41. A device in accordance with claim 1 wherein a single set of said parallel reflective elements is formed at said surface and said preselected angles of incidence and reflection are arranged to provide a reflection of said surface elastic waves at said single set of parallel reflective elements which is other than a 180° reflection.

42. A device in accordance with claim 41 wherein said preselected angles of incidence and reflection are arranged to provide a right angle reflection of said surface elastic waves at said single set of parallel reflective elements.

43. A device in accordance with claim 1 wherein said reflective elements are arranged so that the path length of said surface elastic wave is substantially constant independently of frequency to provide a bandpass filtering action.

* * * * *